(12) United States Patent
Ito et al.

(10) Patent No.: US 11,834,839 B2
(45) Date of Patent: Dec. 5, 2023

(54) LINING METHOD AND LINING

(71) Applicant: MITSUBISHI HEAVY INDUSTRIES, LTD., Tokyo (JP)

(72) Inventors: Takao Ito, Tokyo (JP); Hayao Kurono, Tokyo (JP); Shuhei Dobara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 408 days.

(21) Appl. No.: 17/049,649

(22) PCT Filed: Feb. 25, 2019

(86) PCT No.: PCT/JP2019/007132
§ 371 (c)(1),
(2) Date: Oct. 22, 2020

(87) PCT Pub. No.: WO2019/207941
PCT Pub. Date: Oct. 31, 2019

(65) Prior Publication Data
US 2021/0257117 A1    Aug. 19, 2021

(30) Foreign Application Priority Data

Apr. 25, 2018    (JP) .................................. 2018-084449

(51) Int. Cl.
*E04F 13/08* (2006.01)
*G21C 19/07* (2006.01)
(Continued)

(52) U.S. Cl.
CPC ........ *E04F 13/0862* (2013.01); *B65D 90/043* (2013.01); *B65D 90/08* (2013.01);
(Continued)

(58) Field of Classification Search
CPC .. B65D 90/043; B65D 90/041; B65D 90/044; B65D 90/042; E04F 13/075;
(Continued)

(56) References Cited

U.S. PATENT DOCUMENTS 3,859,765 A * 1/1975 Nelsson ................ E04B 2/7854
52/424
4,030,849 A * 6/1977 Keifert ..................... B23K 9/23
403/272
(Continued)

FOREIGN PATENT DOCUMENTS

CN      111270821 A  *  6/2020  .......... E04F 13/0846
JP      S55-5359 A      1/1980
(Continued)

OTHER PUBLICATIONS

Extended European Search Report dated Oct. 24, 2022, issued in counterpart EP application No. 22184626.4. (8 pages).

(Continued)

*Primary Examiner* — Ryan D Kwiecinski
(74) *Attorney, Agent, or Firm* — WHDA, LLP (57) ABSTRACT

A lining method includes fixing a backing strip in a frame shape to a concrete surface of already-placed concrete so that the backing strip protrudes from the concrete surface; disposing a filler inside a frame of the backing strip; making edges of a plurality of lining plates butt against each other at a position of the backing strip to cover the backing strip and the concrete surface; and joining the edges of the lining plates by seal welding.

3 Claims, 10 Drawing Sheets

(51) Int. Cl.
    *E04B 1/16* (2006.01)
    *B65D 90/04* (2006.01)
    *B65D 90/08* (2006.01)
(52) U.S. Cl.
    CPC .......... *E04B 1/167* (2013.01); *E04F 13/0889* (2013.01); *G21C 19/07* (2013.01)
(58) Field of Classification Search
    CPC . E04F 13/076; E04F 13/0862; E04F 13/0875; E04F 13/0892; E04F 13/0898; E04F 13/09; E04F 13/12; E04F 13/22; E04F 13/0832; E04F 13/0876; E04F 13/0878; G21C 13/093; G21C 19/07; G21F 1/04; E04B 1/64; E04H 7/18
    See application file for complete search history.

(56) References Cited

U.S. PATENT DOCUMENTS

| | | | | |
|---|---|---|---|---|
| 4,178,729 A * | 12/1979 | Jennings | ................. | G21C 19/07 52/249 |
| 4,279,701 A * | 7/1981 | Ebata | ................. | G21C 11/081 976/DIG. 161 |
| 4,321,110 A * | 3/1982 | Nickel | ................. | G21C 13/10 376/250 |
| 4,473,974 A | 10/1984 | Orii et al. | | |
| 4,764,336 A * | 8/1988 | Aubert | ................. | G21C 13/093 376/250 |
| 5,638,652 A * | 6/1997 | Shinoda | ............... | G21C 13/093 52/432 |
| 6,988,343 B2 * | 1/2006 | Gleeson | ................. | B32B 5/022 52/800.1 |
| 7,877,948 B2 * | 2/2011 | Davies | ................. | F16B 5/0225 411/397 |
| 8,785,805 B2 * | 7/2014 | Simon | ................. | B23K 9/0352 219/57 |
| 8,826,620 B2 * | 9/2014 | Krause | ............... | E04F 13/0875 52/489.1 |
| 9,404,254 B2 * | 8/2016 | Reigstad | .................... | E04B 5/32 |
| 10,366,797 B2 * | 7/2019 | Lee | ......... | G21C 19/07 |
| 11,066,832 B2 * | 7/2021 | Krause | ................. | E04B 1/7629 |

FOREIGN PATENT DOCUMENTS

| | | |
|---|---|---|
| JP | S56-124900 U | 9/1981 |
| JP | S59-70998 A | 4/1984 |
| JP | H02-14096 U | 1/1990 |
| JP | H05-172684 A | 7/1993 |
| JP | H09-301488 A | 11/1997 |
| JP | 2004-154838 A | 6/2004 |
| KR | 101849257 B1 * | 4/2018 |
| WO | WO-2009121346 A2 * | 10/2009 ................ F16B 5/06 |

OTHER PUBLICATIONS

Office Action dated Nov. 9, 2021, issued in counterpart JP Application No. 2018-084449, with machine translation. (5 pages).
Written Opinion dated May 21, 2019, issued in counterpart Application No. PCT/JJP2019/007132, with English Translation. (9 pages).

* cited by examiner

LINING METHOD AND LINING

FIELD

The present invention relates to a lining method and a lining.

BACKGROUND

For example, in a nuclear power generation plant, a fuel pit that temporarily stores a spent fuel assembly and a new, unused fuel assembly in water is provided in a nuclear reactor containment building. The fuel pit is a water storage tank made of concrete, and has a concrete wall covered with a lining formed of a stainless steel plate (for example, see Patent Literature 1).

CITATION LIST

Patent Literature

Patent Literature 1: Japanese Patent Application Laid-open No. 2004-154838

SUMMARY

Technical Problem

Lining is performed in such a manner that, prior to the placement of concrete, a backing strip that is to be embedded in a concrete wall is disposed in a frame shape along the concrete wall, and, after the placement of concrete, a plurality of stainless steel lining plates is butt-joined against each other via the backing strip by seal welding. That is, lining includes the operation of disposing the backing strip and the operation of welding the stainless steel lining plates.

However, the operation of disposing the backing strip needs to be executed before the placement of concrete, whereas the operation of welding the stainless steel lining plates needs to be executed after the placement of concrete. Thus, the lining needs to be executed before and after the placement of concrete, and accordingly a problem arises that the co-existence of the operation of the placement of concrete and the operation of lining causes a conflict between these operations, and thereby causes poor workability and makes a work period longer.

The present invention is to solve the above-described problem, and an object of the present invention is to provide a lining method and a lining that are capable of enhancing workability and thereby shortening a work period.

Solution to Problem

In order to achieve the object, a lining method according to one aspect of the present invention includes the steps of: fixing a backing strip in a frame shape to a concrete surface of already-placed concrete; and making edges of a plurality of lining plates butt against each other at a position of the backing strip to cover the backing strip and the concrete surface and joining the edges of the lining plates by seal welding.

In the lining method according to one aspect of the present invention, it is preferable that the backing strip is fixed to the concrete surface so as to protrude from the concrete surface, and the lining method further includes the step of disposing a filler inside a frame of the backing strip protruding from the concrete surface.

In order to achieve the object, a lining method according to one aspect of the present invention includes the steps of: forming a lining panel in such a manner that a filler is disposed inside a frame of a backing strip in a frame shape and a lining plate is fixed to cover inside of the frame of the backing strip; making a plurality of the backing strips adjacent to each other and combining the backing strips in such a manner that edges of lining plates of a plurality of the lining panels butt against each other at positions of the backing strips, and fixing the backing strips to a concrete surface of already-placed concrete; and joining the edges of the lining plates of the lining panels by seal welding.

In the lining method according to one aspect of the present invention, it is preferable that the filler is made of metal, and the filler is fixed to the backing strip by seal welding.

In order to achieve the object, a lining according to one aspect of the present invention includes a backing strip fixed to a concrete surface of already-placed concrete so as to protrude from the concrete surface and form a frame shape; a filler disposed inside a frame of the backing strip protruding from the concrete surface; and a plurality of lining plates whose edges are butt-joined to each other at a position of the backing strip so as to cover the backing strip, the filler, and the concrete surface.

In order to achieve the object, a lining according to one aspect of the present invention includes a lining panel. The lining panel includes a backing strip formed in a frame shape, a filler disposed inside a frame of the backing strip, and a lining plate covering inside of the frame of the backing strip and fixed to the backing strip. The backing strips of a plurality of the lining panels are made adjacent to each other and combined, and fixed to already-placed concrete, so that edges of a plurality of the lining plates are arranged to butt against each other and allow seal welding.

In the lining according to one aspect of the present invention, it is preferable that, in each of the lining panels, a fitting part is provided in a joint of the backing strips.

In the lining according to one aspect of the present invention, it is preferable that the fitting part is formed in a wedge shape so that the backing strip later fixed to the concrete is pressed against a concrete surface, with respect to the backing strip previously fixed to the concrete.

Advantageous Effects of Invention

According to the present invention, a conflict between the step of the placement of concrete and the step of lining can be eliminated and the lining can be started after the placed concrete is turned over, so that workability can be enhanced, whereby a work period can be shortened. As a result, an increase in quality and a reduction in manufacturing costs can be achieved.

DESCRIPTION OF EMBODIMENTS

Hereinafter, embodiments according to the present invention will be described in detail, based on the drawings. Note that the invention is not limited by the embodiments. Besides, constituents in the following embodiments include constituents easily replaceable by persons skilled in the art or constituents substantially identical to the constituents.

First Embodiment

Figure 1:
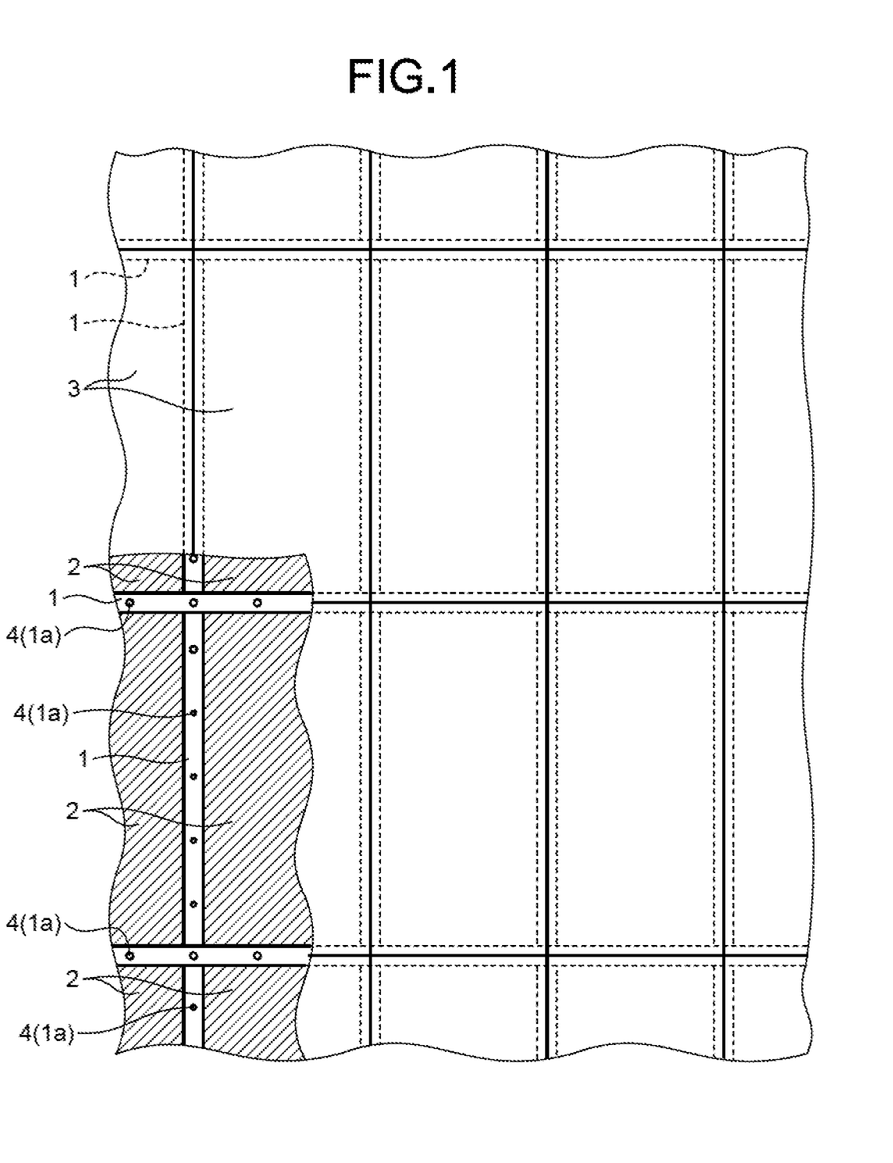
FIG. 1 is a plan view of a lining according to an embodiment of the present invention.
Figure 2:
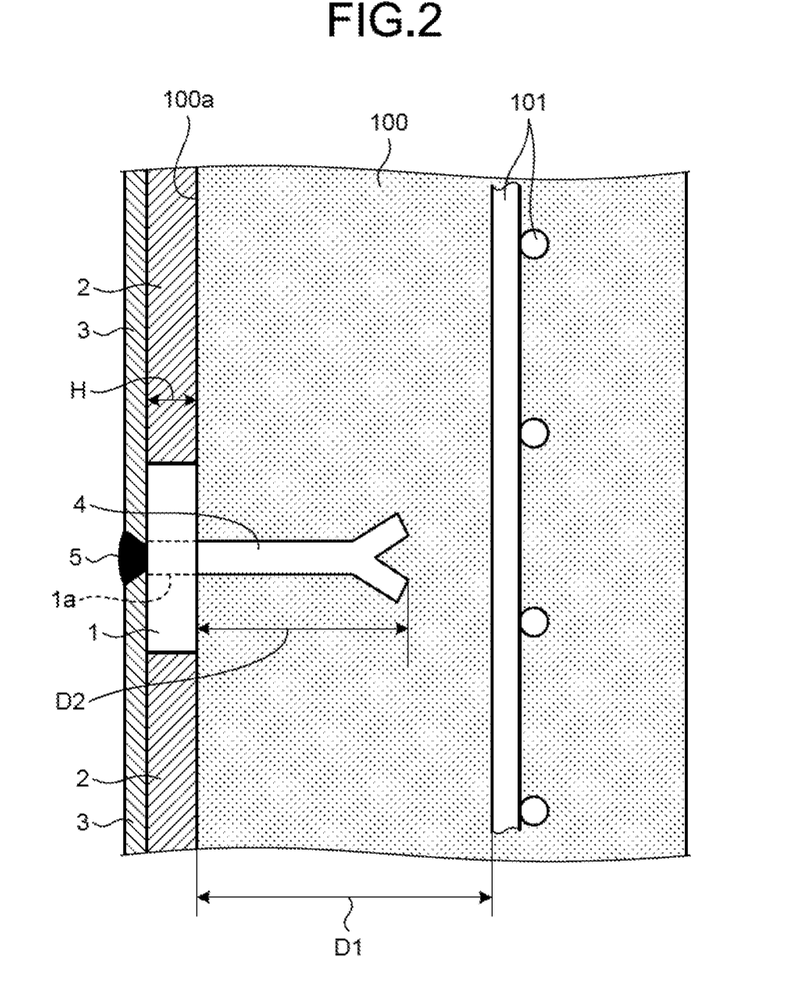
FIG. 2 is a cross-sectional view of the lining according to the embodiment of the present invention.
Figure 3:
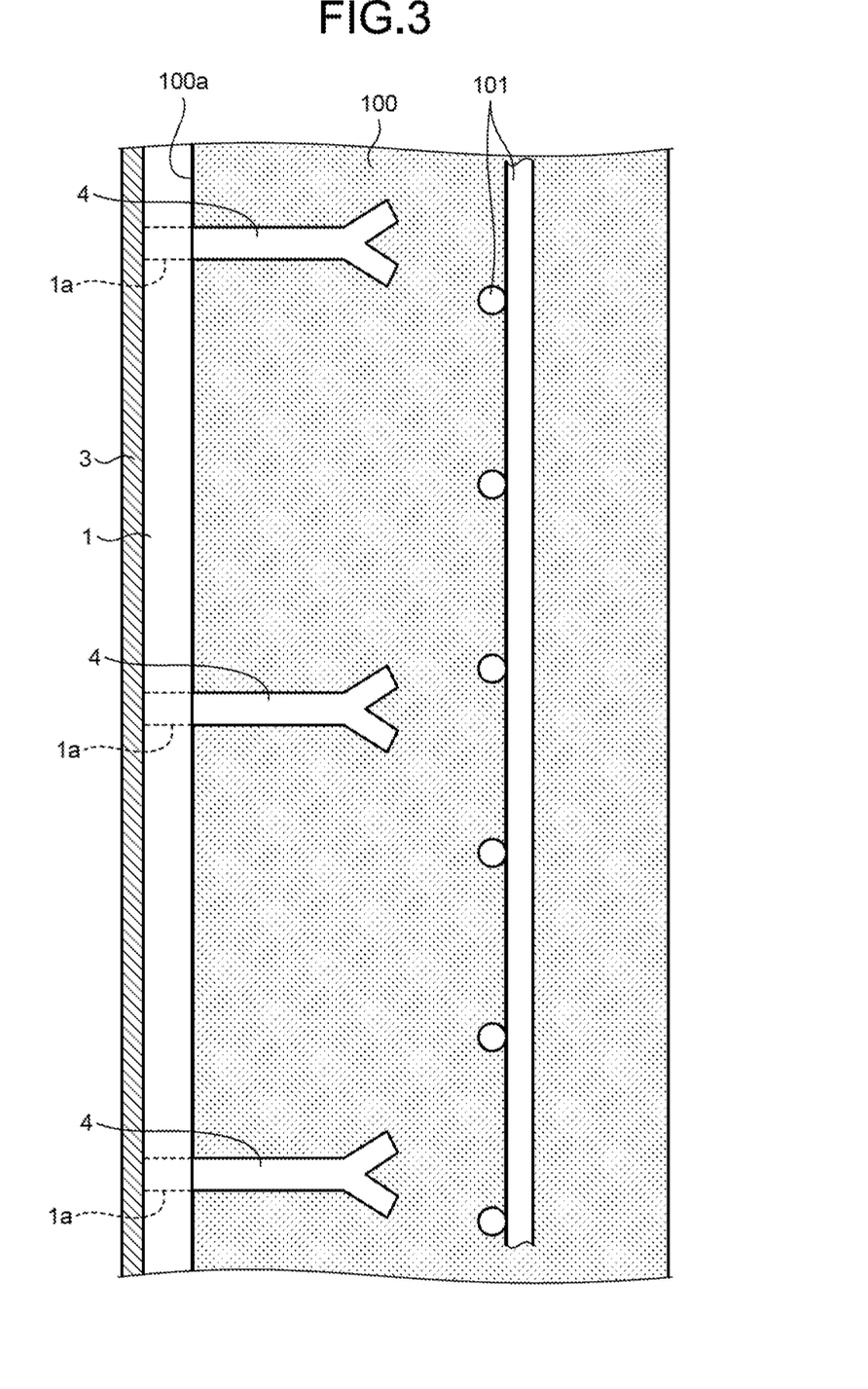
FIG. 3 is a cross-sectional view of the lining according to the embodiment of the present invention.

FIG. 1 is a plan view of a lining according to the present embodiment. FIG. 2 and FIG. 3 are cross-sectional views of the lining according to the present embodiment. Note that FIG. 2 and FIG. 3 are different in cross-section position.

As illustrated in FIG. 1 to FIG. 3, the lining of the present embodiment includes a backing strip 1, a filler 2, and a lining plate 3. The lining of the present embodiment is configured to prevent water leakage into already-placed concrete 100 by covering a concrete surface 100a of the concrete 100 with the lining plate 3.

The backing strip 1 is fixed to the concrete surface 100a of the already-placed concrete 100 by an anchor 4. To be fixed by the anchor 4 driven into the concrete 100, the backing strip 1 is provided with a fixing hole 1a. The backing strip 1 is used as a butting position to make edges of a plurality of the lining plates 3 butt against each other, and is a member configured to fix the lining plates 3 with seal welding 5 when edges of the lining plates 3 are joined via the seal welding 5. Thus, the backing strip 1 is fixed to the concrete surface 100a so as to form a frame shape in accordance with the size of the lining plate 3. The lining plates 3 are made of stainless steel which is excellent in corrosion resistance, and accordingly the backing strip 1 is also made of stainless steel in order to be joined with the lining plates 3 by welding.

Here, the already-placed concrete 100 constitutes a wall, a floor, and a ceiling of a building in a nuclear power generation facility, and, prior to the fixing of the backing strip 1, the concrete 100 is placed with the steel rod 101 embedded therein. A wall, a floor, and a ceiling made of the concrete 100 constitute, for example, a water storage tank to store a refueling water for the cooling and shielding of a fuel assembly, or a fuel pit to temporarily store a fuel assembly in cooling water. As the refueling water and the cooling water, pure water or a boric acid solution is used. The already-placed concrete 100 is placed in such a manner that the depth D1 of cover (a plain concrete region) between the concrete surface 100a to which the backing strip 1 is fixed and the steel rod 101 is larger than the depth D2 to which the anchor 4 is driven, so that the anchor 4 does not cause interference with the steel rod 101. Thus, in the present embodiment, the concrete 100 is placed in advance prior to the construction of the lining.

The filler 2 is configured to be filled inside the frame of the backing strip 1. The backing strip 1 of the present embodiment is fixed to the concrete surface 100a of the already-placed concrete 100 as described above, and thus the backing strip 1 is not embedded under the concrete surface 100a, but disposed so as to protrude from the concrete surface 100a. Accordingly, a gap H is generated between the lining plates 3 joined via the backing strip 1 and the concrete surface 100a, and, for the purpose of preventing the deformation of the lining plates 3 when the hydraulic pressure of the refueling water and the cooling water is applied to the lining plates 3 due to the gap H, the filler 2 is filled inside the frame of the backing strip 1 to fill the gap H. As the filler 2, a material is preferably chosen in consideration of resistance to operating conditions, such as temperature and radiation generated from a fuel assembly, and a period for use together with the lining plate 3. Examples of the filler 2 to be used include a cement board, mortar, an epoxy resin, and a metal plate. When these materials are applied to fill the gap H, the effect of isolating the lining plates 3 from a salt contained in the concrete 100 can be achieved, so that the integrity of the lining can be enhanced.

The lining plates 3 are made of stainless steel which is excellent in corrosion resistance, and are formed so as to match the above-mentioned framed shape of the backing strip 1. The lining plates 3 to be applied may have, for example, a material having a thickness of about 2 mm to 6 mm.

Thus, the lining of the present embodiment includes: the backing strip 1 fixed to the concrete surface 100a of the already-placed concrete 100 so as to protrude from the concrete surface 100a and form a frame shape; the filler 2 disposed inside a frame of the backing strip 1 protruding from the concrete surface 100a; and the lining plates 3 whose edges are butt-joined to each other at a position of the backing strip 1 so as to cover the backing strip 1, the filler 2, and the concrete surface 100a.

According to this lining, a conflict between the step of the placement of the concrete 100 and the step of lining can be eliminated, and the lining can be started after the placed concrete 100 is turned over, so that workability can be enhanced, whereby a work period can be shortened. As a result, an increase in quality and a reduction in manufacturing costs can be achieved.

Furthermore, with the filler 2 present between the concrete surface 100a and the lining plate 3, a gap H generated due to the protrusion of the backing strip 1 from the concrete surface 100a between the lining plate 3 and the concrete surface 100a, so that the deformation of the lining plate 3 due to external pressure can be prevented. Furthermore, because of the presence of the filler 2 between the concrete surface 100a and the lining plate 3, the concrete 100 can be protected from operating conditions, such as temperature and radiation generated from a fuel assembly, in a nuclear power generation facility.

Figure 4:
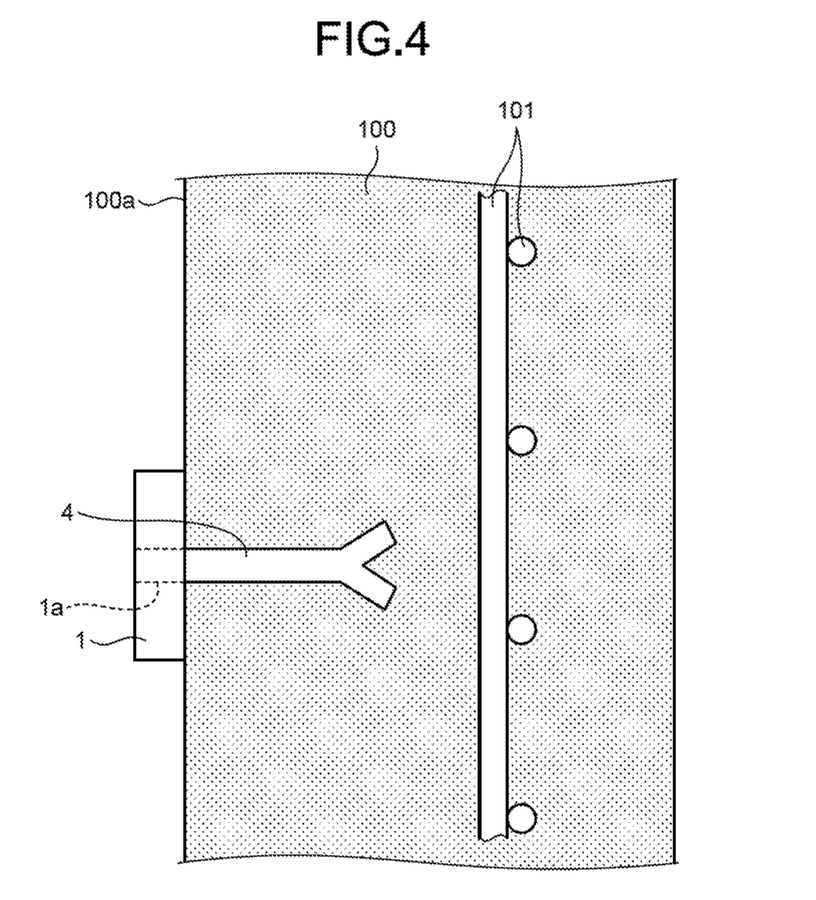
FIG. 4 is a cross-sectional view illustrating a lining method according to an embodiment of the present invention.
Figure 5:
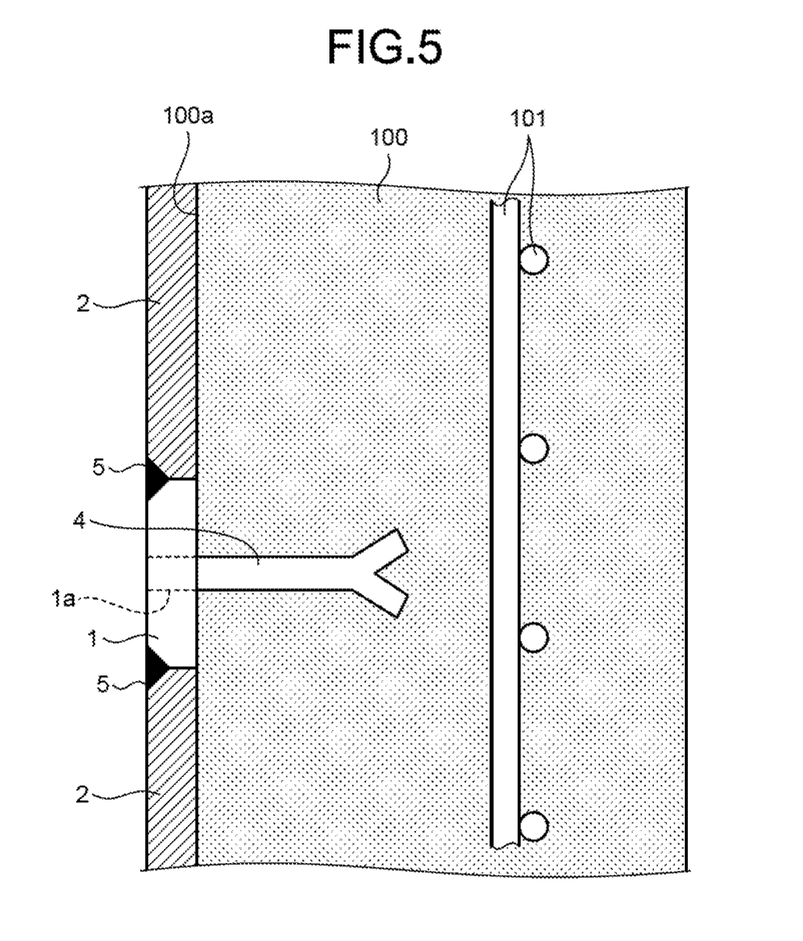
FIG. 5 is a cross-sectional view illustrating the lining method according to the embodiment of the present invention.
Figure 6:
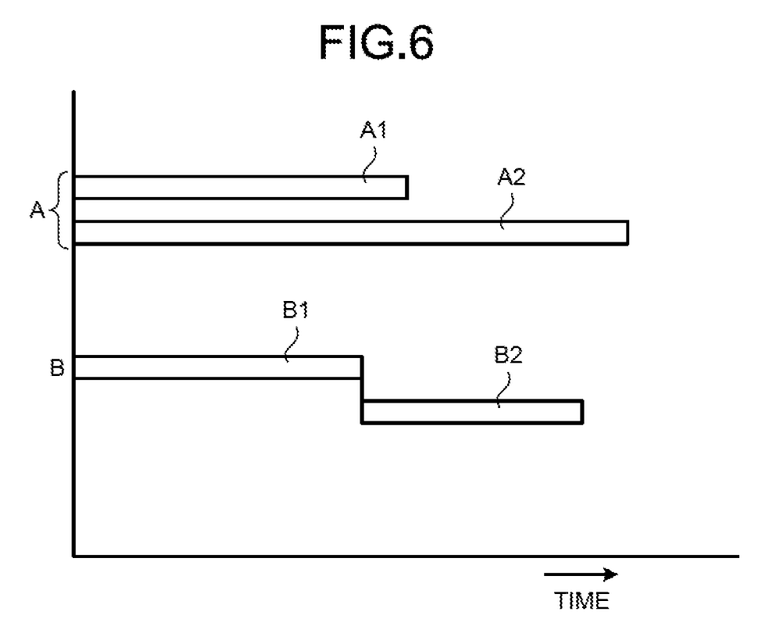
FIG. 6 is a flowchart explaining the lining method according to the embodiment of the present invention.

Hereinafter, a method of constructing the above-described lining will be described. FIG. 4 and FIG. 5 are cross-sectional views illustrating a lining method according to the present embodiment. FIG. 6 is a flowchart explaining the lining method according to the present embodiment.

The lining method of the present embodiment includes the steps of: fixing the backing strip 1 in a frame shape to the concrete surface 100a of the already-placed concrete 100 (see FIG. 4); disposing the filler 2 inside the frame of the backing strip 1 protruding from the concrete surface 100a (see FIG. 5); and making edges of the lining plates 3 each of which covers the backing strip 1, the filler 2, and the concrete surface 100a butt against each other at a position of the backing strip 1, and joining the edges of the lining plates 3 by seal welding 5 (see FIG. 2).

According to this lining method, a conflict between the step of the placement of the concrete 100 and the step of lining can be eliminated, and the lining can be started after the placed concrete 100 is turned over, so that workability can be enhanced, whereby a work period can be shortened. As a result, an increase in quality and a reduction in manufacturing costs can be achieved.

As illustrated in FIG. 6, a conventional construction method A is executed in such a manner that the backing strip 1 is disposed during the placement of the concrete 100. Therefore, a conflict between a step A1 of the placement of the concrete 100 and a step A2 of lining is caused. In the construction method A, the operation of disposing the backing strip 1 is started before the placement of the concrete 100, and therefore a worker who performs lining needs to work simultaneously with a worker who places the concrete 100, so that different types of work are present, whereby workability is made poorer and the whole construction period is made longer. In contrast, a construction method B of the present embodiment is executed in such a manner that the backing strip 1 is disposed after the placement of the concrete 100. Therefore, a conflict between a step B1 of the placement of the concrete 100 and a step B2 of lining can be eliminated, and the lining can be started after the placed concrete 100 is turned over, so that workability at both the steps is enhanced, whereby the whole construction period is shortened.

Note that, in the lining method of the present embodiment, the concrete 100 needs to be placed with the depth D1 so that the steel rod 101 does not cause interference with the anchor 4 configured to fix the backing strip 1. However, the step of the placement of the concrete 100 is performed in consideration of the above-mentioned point, and therefore, no conflict between the step of the placement of the concrete 100 and the step of lining is caused.

As illustrated in FIG. 5, at the step of disposing the filler 2 inside the frame of the backing strip 1, in the case where the filler 2 is a metal plate (made of metal), the backing strip 1 and the filler 2 are preferably joined by seal welding 5.

According to this lining method, joining the backing strip 1 made of metal and the filler 2 by seal welding 5 can achieve higher airtightness and enhanced quality.

In the case where, for example, a projection is formed in a surface of the lining plate 3 facing the concrete surface 100a so as to minimize the gap H generated between the concrete surface 100a and the lining plate 3 by the protrusion of the backing strip 1 from the concrete surface 100a, the filler 2 is unnecessary. In this case, the lining method can include: the step of fixing the backing strip 1 in a frame shape to the concrete surface 100a of the already-placed concrete 100 (see FIG. 4); and the step of making edges of the lining plates 3 butt against each other at a position of the backing strip 1 and joining the edges of the lining plates 3 by seal welding 5 (see FIG. 2). According to this lining method, lining operation can be shortened, whereby a construction period can be made much shorter.

Second Embodiment

Figure 7:
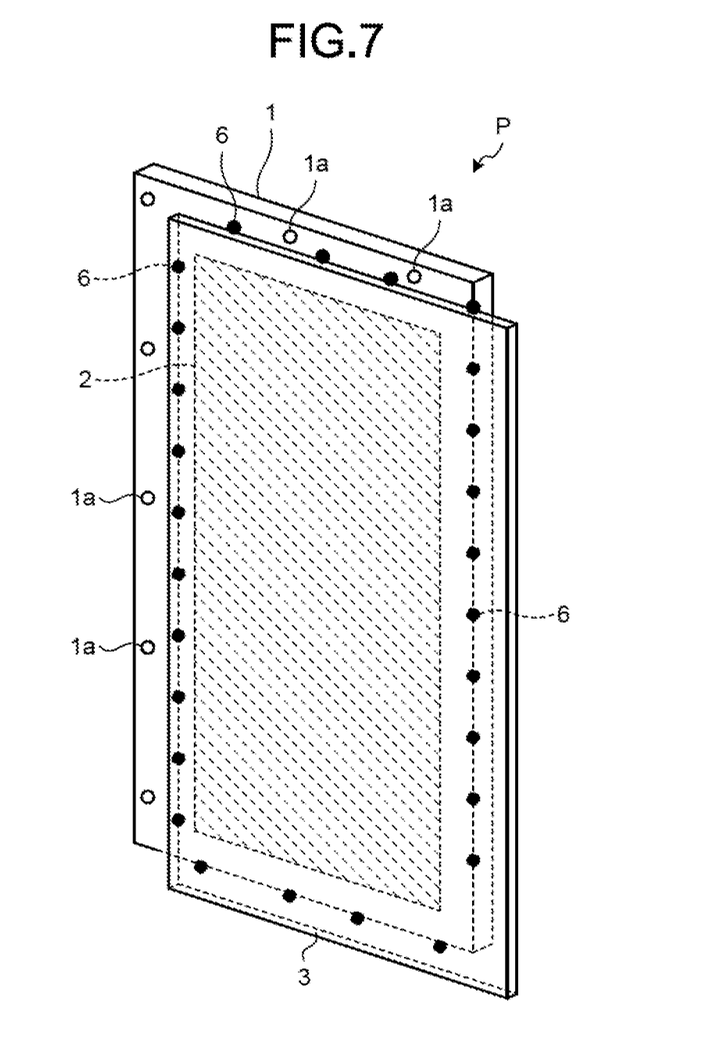
FIG. 7 is a perspective view of another example of the lining according to an embodiment of the present invention.
Figure 8:
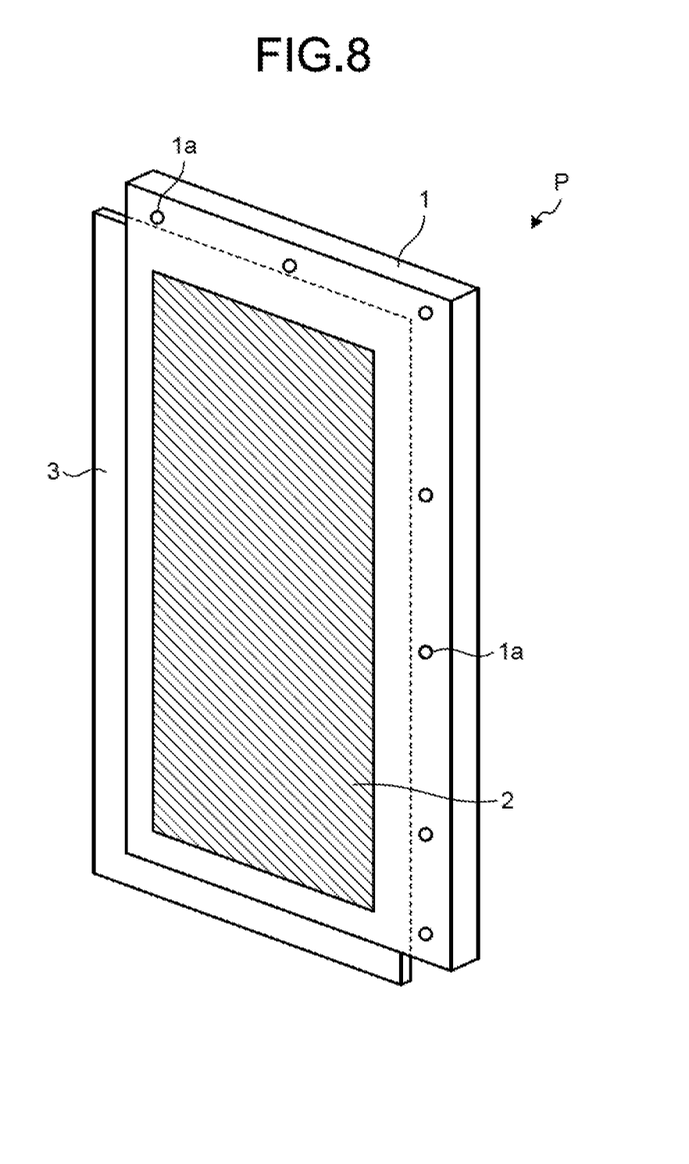
FIG. 8 is a perspective view of the other example of the lining according to the embodiment of the present invention.
Figure 9:
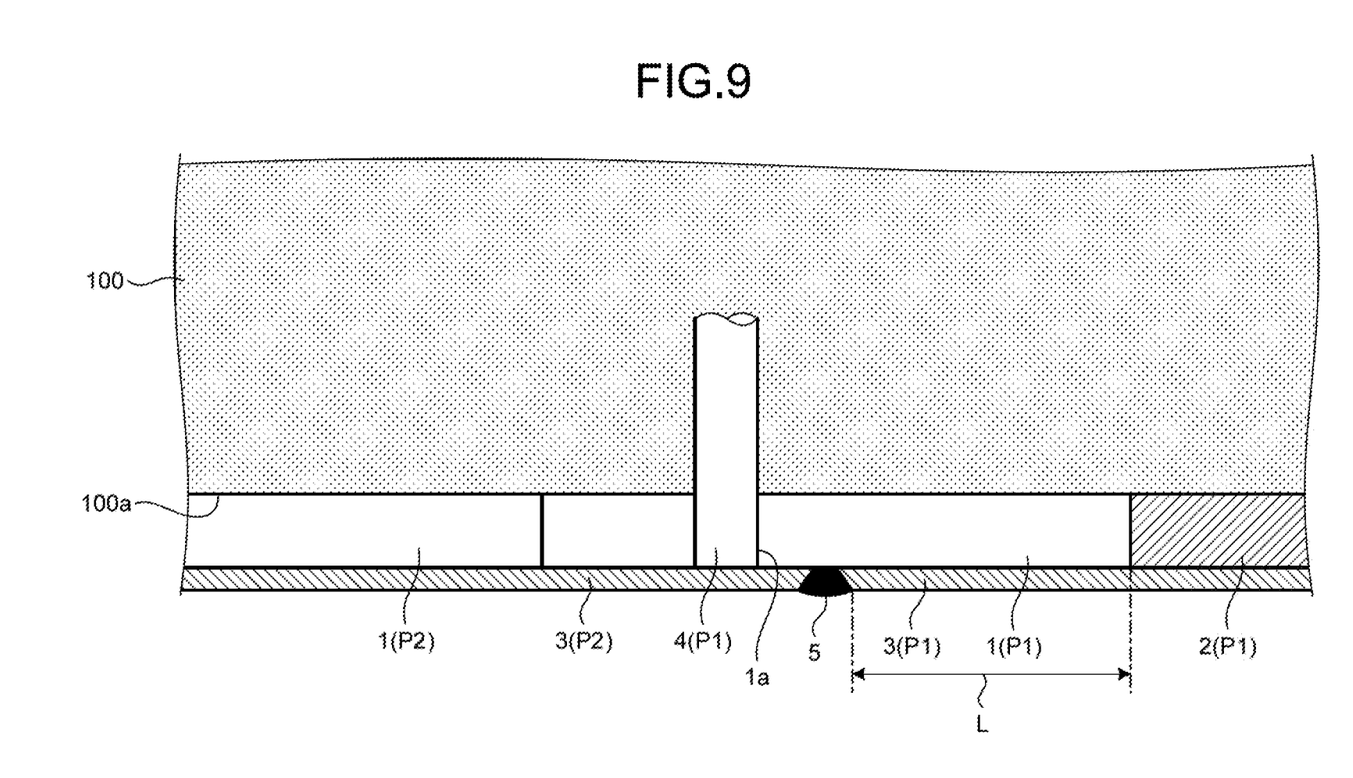
FIG. 9 is a cross-sectional view of the other example of the lining according to the embodiment of the present invention.
Figure 10:
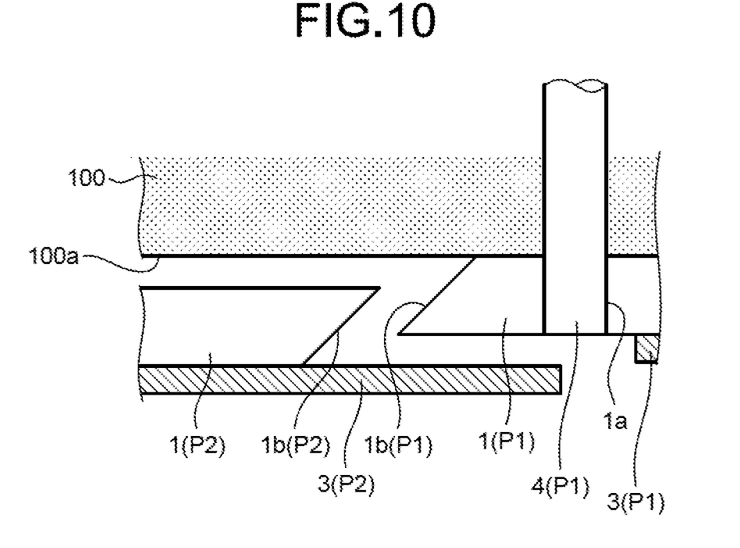
FIG. 10 is a cross-sectional view of the other example of the lining according to the embodiment of the present invention.

FIG. 7 and FIG. 8 are perspective views of another example of a lining according to the present embodiment. FIG. 9 and FIG. 10 are cross-sectional views of the other example of the lining according to the present embodiment.

Note that, in the lining and a lining method of the present embodiment, constituents equivalent to those of the above-described first embodiment are given the same reference numerals, and descriptions thereof will be omitted.

As illustrated in FIG. 7 and FIG. 8, the lining of the present embodiment forms a lining panel P that includes the backing strip 1, the filler 2, and the lining plate 3. FIG. 7 illustrates the front side (the lining plate 3 side) of the lining panel P. FIG. 8 illustrates the back side (the backing strip 1 side) of the lining panel P.

In the lining panel P, the backing strip 1 is formed in a frame shape as illustrated in FIG. 7 and FIG. 8. In an aspect illustrated in FIG. 7 and FIG. 8, the backing strip 1 is formed in a rectangular frame shape. In this backing strip 1, fixing holes 1a are formed on two of four sides of the rectangle, the two sides being adjacent to each other in an L-shaped manner, whereas any fixing hole 1a is not formed on the other two sides.

The filler 2 is disposed inside the frame of the backing strip 1 and attached to the backing strip 1.

The lining plate 3 is formed in a rectangular shape equivalent to the external rectangular shape of the backing strip 1. The lining plate 3 is disposed to be obliquely shifted from the rectangle of the backing strip 1 so as not to overlap the fixing holes 1a on the two sides of the backing strip 1, and is fixed by temporal welding 6.

Note that FIG. 7 and FIG. 8 illustrate the embodiment in which, in the lining panel P, the backing strip 1 is formed in the rectangular frame shape, but the shape of the backing strip 1 is not limited to this. Although not illustrated, the backing strip 1 may be formed, for example, in a U or L shape in which one or all sides having no fixing hole 1a are notched, and may be combined with a portion having a fixing hole 1a of another lining panel P and thereby form a rectangular frame shape.

Then, a plurality of the same lining panels P is formed. In other words, as illustrated in FIG. 9, backing strips 1 of the lining panels P1 and P2 are made adjacent to and combined with each other, and fixed to the already-placed concrete 100 by the anchor 4, so that edges of the lining plates 3 of the lining panels P1 and P2 are arranged to butt against each other so as to allow seal welding 5. As illustrated in FIG. 9, in the lining panel P1, a side of the backing strip 1 having a fixing hole 1a is fixed by the anchor 4, and, in the lining panel P2 adjacent to the lining panel P1, a side of the backing strip 1 having no fixing hole 1a is joined to the lining panel P1 via seal welding 5 by joining edges of the lining plates 3 via seal welding 5.

Note that, in the lining panel P1 in FIG. 9, in the case where the filler 2 is formed of a material that is sensitive to the heat of seal welding 5 of edges of the lining plate 3, the backing strip 1 is formed in such a manner that a distance L between the edge of the lining plate 3 and the filler 2 is sufficiently secured in order to prevent the filler 2 from being influenced by the heat, and thus, the influence of the welding heat on the filler 2 can be made smaller.

Thus, with the lining of the present embodiment, the lining panel P is formed beforehand and transported to a construction site, and the lining panel P is fixed to the already-placed concrete 100 at the construction site. Thus, in the construction method B of the present embodiment illustrated in FIG. 6, the lining panel P is formed by the time the step B1 of placing the concrete 100 is completed, and, at the step B2 of the lining after the placed concrete 100 is turned over, the lining panel P is fixed to the concrete 100. As a result, the step B2 of the lining after the placed concrete 100 is turned over can be shortened, compared with the first embodiment. As a result, an increase in quality and a reduction in manufacturing costs can be achieved.

In the lining of the present embodiment, as illustrated in FIG. 10, the lining panels P (P1, P2) each are preferably provided with a fitting part 1b in a joint between the backing strips 1.

In FIG. 10, the fitting part 1b is formed in a wedge shape so that the backing strip 1 of the lining panel P2 later fixed to the concrete 100 is pressed against the concrete surface 100a, with respect to the backing strip 1 of the lining panel P1 previously fixed to the concrete 100.

Thus, in each of the lining panels P (P1, P2), the fitting part 1b is provided in the joint of the backing strips 1, so that the backing strip 1 of the lining panel P2 later fixed to the concrete 100 can be attached to the concrete 100 via the backing strip 1 of the lining panel P1 previously fixed to the concrete 100. As a result, positioning and holding to join the edges of the lining plates 3 by seal welding 5 can be performed using the backing strip 1.

Furthermore, as illustrated in FIG. 10, the fitting parts 1b are formed in a wedge shape so that the backing strip 1 of the lining panel P2 later fixed to the concrete 100 is pressed against the concrete surface 100a, with respect to the backing strip 1 of the lining panel P1 previously fixed to the concrete 100, so that positioning and holding to join the edges of the lining plates 3 by seal welding 5 can be easily and surely performed.

Furthermore, the lining method using this lining panel P includes the steps of: forming the lining panel P in such a manner that the filler 2 is disposed inside the frame of the frame-shaped backing strip 1 and the lining plate 3 is fixed to cover the inside of the frame of the backing strip 1; combining the frames of the backing strips 1 in such a manner that the edges of the lining plates 3 of the lining panels P (P1, P2) butt against each other at a position of the backing strips 1, and fixing the backing strips 1 to the concrete surface 100a of the already-placed concrete 100; and joining the edges of the lining plates 3 of the lining panels P (P1, P2) by seal welding 5.

According to this lining method, the lining panel P is formed beforehand and transported to a construction site, and the lining panel P can be fixed to the already-placed concrete 100 at the construction site. Thus, in the construction method B of the present embodiment illustrated in FIG. 6, the lining panel P is formed by the time the step B1 of placing the concrete 100 is completed, and, at the step B2 of the lining after the placed concrete 100 is turned over, the lining panel P is fixed to the concrete 100. As a result, the step B2 of the lining after the placed concrete 100 is turned over can be shortened, compared with the first embodiment. As a result, an increase in quality and a reduction in manufacturing costs can be achieved.

At the step of disposing the filler 2 inside the frame of the backing strip 1, in the case where the filler 2 is a metal plate (made of metal), the backing strip 1 and the filler 2 are preferably joined by seal welding 5 as illustrated in FIG. 5.

According to this lining method, joining the metal backing strip 1 and the filler 2 by seal welding 5 can achieve higher airtightness and enhanced quality.

REFERENCE SIGNS LIST

1 Backing strip
1a Fixing hole
1b Fitting part
2 Filler
3 Lining plate
4 Anchor
5 Seal welding
6 Temporal welding
100 Concrete
100a Concrete surface
101 Steel rod
P (P1, P2) Lining panel

The invention claimed is:

1. A lining method comprising:
forming a plurality of lining panels so that in each lining panel, a filler is disposed inside a frame of a backing strip in a frame shape and a lining plate is fixed to cover inside of the frame of the backing strip;
making the plurality of lining panels adjacent to each other to combine the backing strips in such a manner that edges of the lining plates of the adjacent lining panels butt against each other at a position of the backing strip of one of the adjacent lining panels, and fixing the backing strips to a concrete surface of already-placed concrete; and
joining the edges of the lining plates of the adjacent lining panels by seal welding, wherein
the already-placed concrete is placed with a steel rod embedded therein prior to the fixing of the backing strip,
in each of the lining panels, a fitting part is provided in a joint of the backing strips of the adjacent lining panels,
a first lining panel which is one of the adjacent lining panels has the fitting part which protrudes to a second lining panel which is another of the adjacent lining panels, as being away from the concrete surface in a thickness direction, and
the second lining panel has the fitting part which protrudes to the first lining panel as being close to the concrete surface in a thickness direction.

2. The lining method according to claim 1, wherein the filler is made of metal, and the filler is fixed to the backing strip by seal welding.

3. A lining to prevent leakage into already-placed concrete, comprising:
a plurality of lining panels,
each lining panel including
a backing strip formed in a frame shape,
a filler disposed inside a frame of the backing strip, and
a lining plate covering inside of the frame of the backing strip and fixed to the backing strip, wherein
the plurality of the lining panels are arranged adjacent to each other to combine the backing strips, and the backing strips are fixed to the already-placed concrete, so that edges of the lining plates of the adjacent lining panels butt against each other, wherein
one surface of the backing strip is in contact with the concrete surface,
an anchor inserted from other surface of the backing strip to inside of the concrete, wherein,
in each of the lining panels, a fitting part is provided in a joint of the backing strips of the adjacent lining panels,
a first lining panel which is one of the adjacent lining panels has the fitting part which protrudes to a second lining panel which is another of the adjacent lining panels, as being away from the concrete surface in a thickness direction, and
the second lining panel has the fitting part which protrudes to the first lining panel as being close to the concrete surface in a thickness direction.

* * * * *